US006202342B1

United States Patent
Edwards

(10) Patent No.: US 6,202,342 B1
(45) Date of Patent: *Mar. 20, 2001

(54) BIODEGRADABLE PESTICIDE DELIVERY SYSTEM

(76) Inventor: Allen W. Edwards, 10281 Wales Loop, Bonita Springs, FL (US) 34135

(*) Notice: Subject to any disclaimer, the term of this patent is extended or adjusted under 35 U.S.C. 154(b) by 0 days.

This patent is subject to a terminal disclaimer.

(21) Appl. No.: 09/268,153

(22) Filed: Mar. 15, 1999

Related U.S. Application Data

(63) Continuation-in-part of application No. 09/013,212, filed on Jan. 26, 1998, now Pat. No. 5,953,855.

(51) Int. Cl.[7] .................................................. A01M 1/02
(52) U.S. Cl. ................................................. 43/132.1
(58) Field of Search ........................... 43/124, 131, 132.1

(56) References Cited

U.S. PATENT DOCUMENTS

| | | | | |
|---|---|---|---|---|
| 984,352 | * | 2/1911 | Costello ............................... | 43/132.1 |
| 5,329,726 | * | 7/1994 | Thorne et al. ........................ | 43/132.1 |
| 5,564,222 | * | 10/1996 | Brody .................................. | 43/132.1 |

* cited by examiner

*Primary Examiner*—Thomas Price

(57) ABSTRACT

The invention relates to a biodegradable, single stage pesticide delivery system, to protect wooden structures by controlling insects such as termites, and other wood destroying organisms, particularly the subterranean species. The biodegradable pesticide delivery system is a unique perforated and pressure treated sacrificial wood casing member with an interior cavity prefilled with a pesticide. Foraging wood destroying insects, such as subterranean termites, attack the non pressure treated areas of the wooden casing member. The casing member is a round cylindrical casing. It has also been found that casings in the shape of a square offer different advantages in that longitudinal depressions can be milled into their exterior surfaces which offer a much greater area of forage for attacking insects, eliminating the need to selectively pressure treat the casings. Also squared casings offer the opportunity to cluster multiple casings into one grouped unit, wherein each casing can be charged with a different pesticide. Squared surfaces also offer the opportunity to provide longitudinal or horizontal grooves machined into each exterior surface to simulate termite mud tubes. Also disclosed is the fact that round as well as square casings can have brightly colored location markers as closures, they can have a rubber or other flexible material closure with a self sealing hole for a hypodermic needle to pass there through, for injecting liquid pesticides into the casing. The casings either round or square can have an acoustic monitoring system to detect the presence of foraging insects, and the casings can have lateral holes bored into the same at an angle of 45 degrees from the horizontal to prevent soil from filtering into the casing. Also disclosed is the use of a corrugated paper cavity matrix with graduated alignment of the corrugated openings, to stimulate insect activity at the site, or alternatively, the corrugated paper cavity matrix corrugations may be oriented laterally, or longitudinally, and impregnated, or dusted with a pesticide and become an active pesticide carrier.

12 Claims, 12 Drawing Sheets

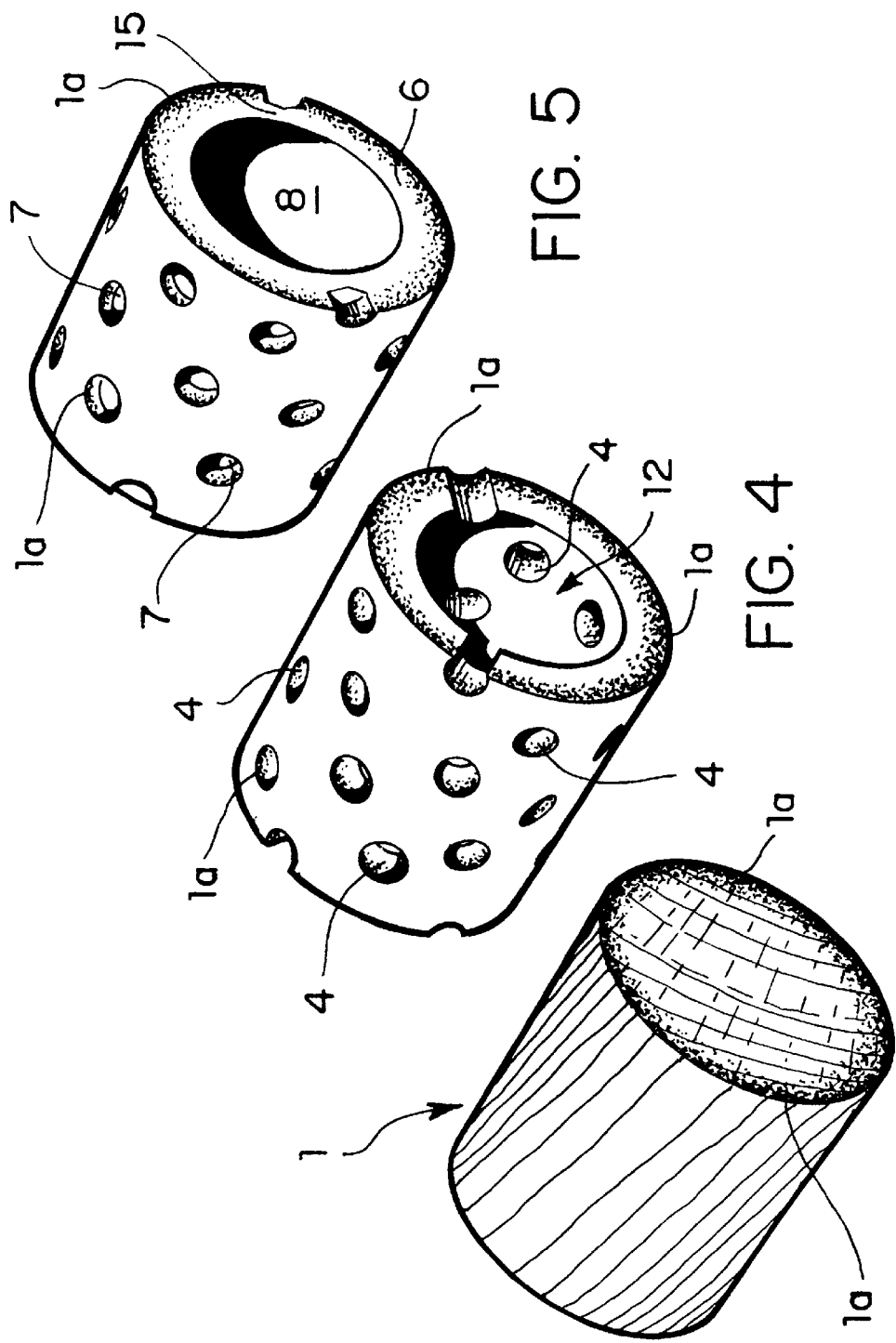

BIODEGRADABLE PESTICIDE DELIVERY SYSTEM

This application is a Continuation-In-Part of my earlier filed application Ser. No. 09/013,212, filed Jan. 26, 1998, now U.S. Pat. No. 5,953,855.

FIELD OF THE INVENTION

The present invention generally relates to a simplified one step, single stage, biodegradable pesticide delivery system for administering pesticide materials to control and/or eliminate noxious insect infestations, and more particularly, this invention relates to a biodegradable pesticide delivery system that can be safely utilized by those who are not skilled in the art of controlling insect infestation.

The science of pesticide pathology is known to be highly complex, that utilizes compounds and substances which can be of a toxic nature, to thereby requiring special handling.

Due to these circumstances, numerous procedures have been developed by those skilled in the art which call for highly specialized programs of a complicated nature which can only be performed by technicians who have received a high degree of training.

Although procedures of the current art are reasonably effective, the capital cost of performing the services is extremely high due to labor intensive procedures by highly qualified personnel.

Therefore a system is needed that will not only utilize the advantages of current technology in the art, but will simplify the application of this technology, and bring it within reach of those not skilled in the art, so that they may safely implement the system effectively and efficiently without extensive training, and at a reasonable cost.

Furthermore, the system must be environmentally friendly and totally biodegradable. The Biodegradable Pesticide Delivery System of this invention fulfills all of these parameters.

BACKGROUND OF THE INVENTION

It is a well known fact that wood destroying insects and organisms such as for example, subterranean termites, are responsible for the destruction of vast quantities of wood used in construction, resulting in huge financial losses. It is estimated that subterranean termite damage alone approaches a billion dollars annually in the United States.

Typically, wood destroying insects such as subterranean termites, are prevalent over a wide range of climatic conditions, and are found to be active in both Northern and Southern regions.

Various types of devices have been known in the prior art for controlling or destroying these noxious insects. Current conventional procedures in the art for the treatment and control of these species and similar noxious insects is extremely difficult to apply and equally expensive to maintain after the initial application.

Also the eradication of for example a colony of subterranean termites, will not ensure there will be no emergence of a new colony at a later date.

It is therefore necessary to commit to an ongoing preventative maintenance program once the incumbent colony has been eliminated.

Furthermore, pesticide control procedures of the current art are generally performed by highly skilled personnel, due to the complex nature of the systems used. This increases the overall cost substantially to the user of such services.

It is also a fact that due to the nature of the chemical pesticides used to treat noxious insect infestation, and the complex manner in which they are applied, the general public are not permitted to buy most of these pesticide chemicals for their own use.

Treatment for noxious insect infestation involves numerous procedures such as the application of toxic soil pesticides, either by spraying, or drilling holes into either the ground, or even the structure to be protected itself and then injecting pesticides.

Another system utilized is the digging of trenches and the installation of physical insect barriers around the perimeter of the structure to be protected in combination with the use of pesticides.

Yet a further system is the installation of underground sensing stations, which are periodically monitored, and subsequently charged with pesticides either in bait or poison form, when insects are observed inside the monitored stations.

In addition, some systems require the installation of a network of perforated underground tubing through which a liquid pesticide is sprayed.

It is obvious that such procedures must be performed by highly trained technicians, which result in extremely expensive application and installation costs.

In addition, due to the complexity of these systems, they are not for sale to the general public as it is reasonable to believe that the general publics lack of expertise in the art which would result in substandard applications, with less than optimal results, and the possibility of environmental damage.

The costs of these current conventional systems as discussed above, is further increased by their ongoing maintenance procedures.

Additional re-treatment of pesticides have to be applied on a periodic or possibly annual basis, and a continuing maintenance program is necessary to monitor the results, due to the nature of the systems.

Furthermore, such maintenance procedures are usually only carried out by highly trained technicians and at a correspondingly high cost.

It is readily apparent that there is the need for a simplified system of controlling noxious insects which should be within the capability of those not skilled in the art to successfully implement and maintain and be able to purchase at a reasonable cost.

Also, due to the rapid deployment of noxious insects such as subterranean termites, it is advantageous to do a pre-emptive, preventative pesticide installation before termites and other noxious insects gain a foothold. This can be accomplished by the installation of the Biodegradable Pesticide Delivery System of this invention.

DESCRIPTION OF THE PRIOR ART

Prior U.S. Pat. No. 5,329,726, issued Jul. 19, 1994, discloses a SYSTEM FOR TERMITE DETECTION AND CONTROL, in which a perforated, and more or less permanent housing is deposited into the ground, and subjected to periodic inspections. Pesticides are placed into the housing upon indications of subterranean termite activity.

The prior patents cited and made of record, the above mentioned patents have been studied including the following patents which relate to this field of endeavor.

U.S. Pat. No. 1,013,514: January 1912
U.S. Pat. No. 2,837,861: June 1958
U.S. Pat. No. 3,017,717: January 1962
U.S. Pat. No. 3,940,875: March 1976
U.S. Pat, No. 4,945,673: August 1990

While the above discussed and listed patents relate to this field of endeavor, they do not disclose the pesticide delivery system described in this invention.

OBJECTS OF THE INVENTION

It is a primary objective of this invention to provide a highly effective, but simple system of delivering and administering pesticides in such a manner so as to be within the ability of those unskilled in this art to be able to safely, and efficiently install, and maintain a high level of protection from insect infestation with a minimum of training and at an economical cost.

Yet another objective of this invention also relates to the safe and efficient single stage administering of pesticide material, in either a poison, or a bait form, in either granular, solid, or liquid state, in order to control noxious insects and wood destroying organisms.

Once the pesticide delivery system of this invention at hand is installed, no further participation, or monitoring procedures are required to be performed on the installed units.

An additional objective of this invention is to make available a variety of ready to use pesticide delivery systems which have been preloaded by the pesticide manufacturers with a commercial type of pesticide such as for example, but not limited to, Dursban, or Hexaflumuron.

This would make available a wide variety of pesticide materials, according to regional requirements, the species of noxious insects to be controlled, and the choice of either a poison, or bait-type pesticide.

The preloading of the pesticide units of the pesticide delivery system would ensure the safe handling of these materials, many of which may be of a toxic nature.

This is so, because the user of the pesticide delivery system will have no actual physical contact with the pre-loaded pesticide materials and will have no opportunity to either ingest or inhale the materials contained therein.

Detailed instructions accompanying each pesticide delivery system, would allow those unskilled in this art to safely and successfully install pesticide delivery systems of this invention.

The installers participation is limited to performing a simple measuring procedure to ensure a nominal separation between the units or stations of the pesticide delivery system and to thereafter drive the preloaded pesticide delivery system units into the ground at measured intervals.

A further object of this invention is cost effectiveness. It can be readily seen that existing procedures under the present state of the art require substantial funding, and indeed, once the procedures are implemented, homeowners would find themselves committed to a continuing financial undertaking in order to preserve the integrity of the system.

The pesticide delivery system resolves this problem. This is so, because the pesticide delivery system of the invention at hand, provides not only a highly efficient utility delivery system for the appropriate pesticide material but a do it yourself "Use and forget" single stage system at a low acquisition and maintenance cost.

Notwithstanding, modifications to the basic system can be easily made to facilitate the use of more advanced monitoring and control procedures dependent upon the level of skill of the user. These modifications are described and explained in detail later on.

Yet another objective of the present invention is also to provide an environmentally friendly Biodegradable Pesticide Delivery System.

Current conventional art relies heavily on plastic components in the construction of their delivery systems, insect traps, monitoring stations, and/or bait containers.

The concept of using a biodegradable pesticide delivery system which is inherently totally insect consumable is contrary to the present teachings in this art which teaches the use of non biodegradable, monitoring or bait stations.

Another object of the present invention is to make extensive use of biodegradable wood or a wood derivative product, such as, pressed wood or similar type of wood based by products or materials which may be substituted for natural wood and used in the construction of the pesticide delivery system.

This commitment of the invention at hand, will ensure an environmentally friendly Biodegradable Pesticide Delivery System which will decompose completely at the end of its useful service life.

Yet another objective of this invention is to provide a simple ongoing maintenance program. This is achieved by the installation of supplementary units of the pesticide delivery system on an annual basis, or as required, in order to maintain the integrity and level of protection achieved after the primary installation of the original system.

BRIEF DESCRIPTION OF THE DRAWINGS

FIG. 3 Is a cylindrical stock of wood after pressure treating.

FIG. 4 Illustrates a view of a cylindrical casing after machining.

FIG. 5 Shows a view of a cylindrical casing after a different machining.

DETAILED DESCRIPTION OF THE DRAWINGS

Figure 1:
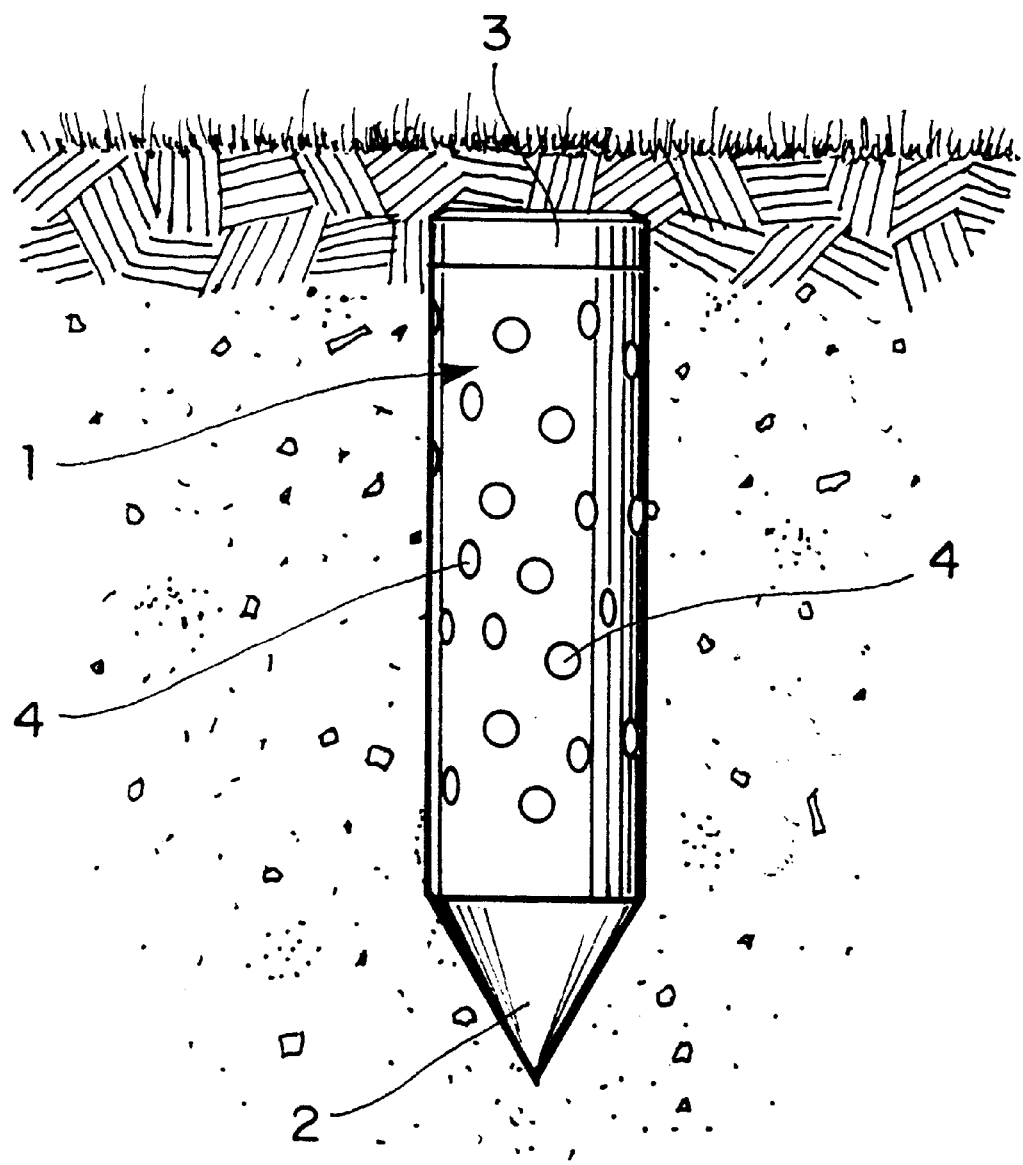
FIG. 1 Illustrates a unit of the invention installed in an underground environment.
Figure 7:
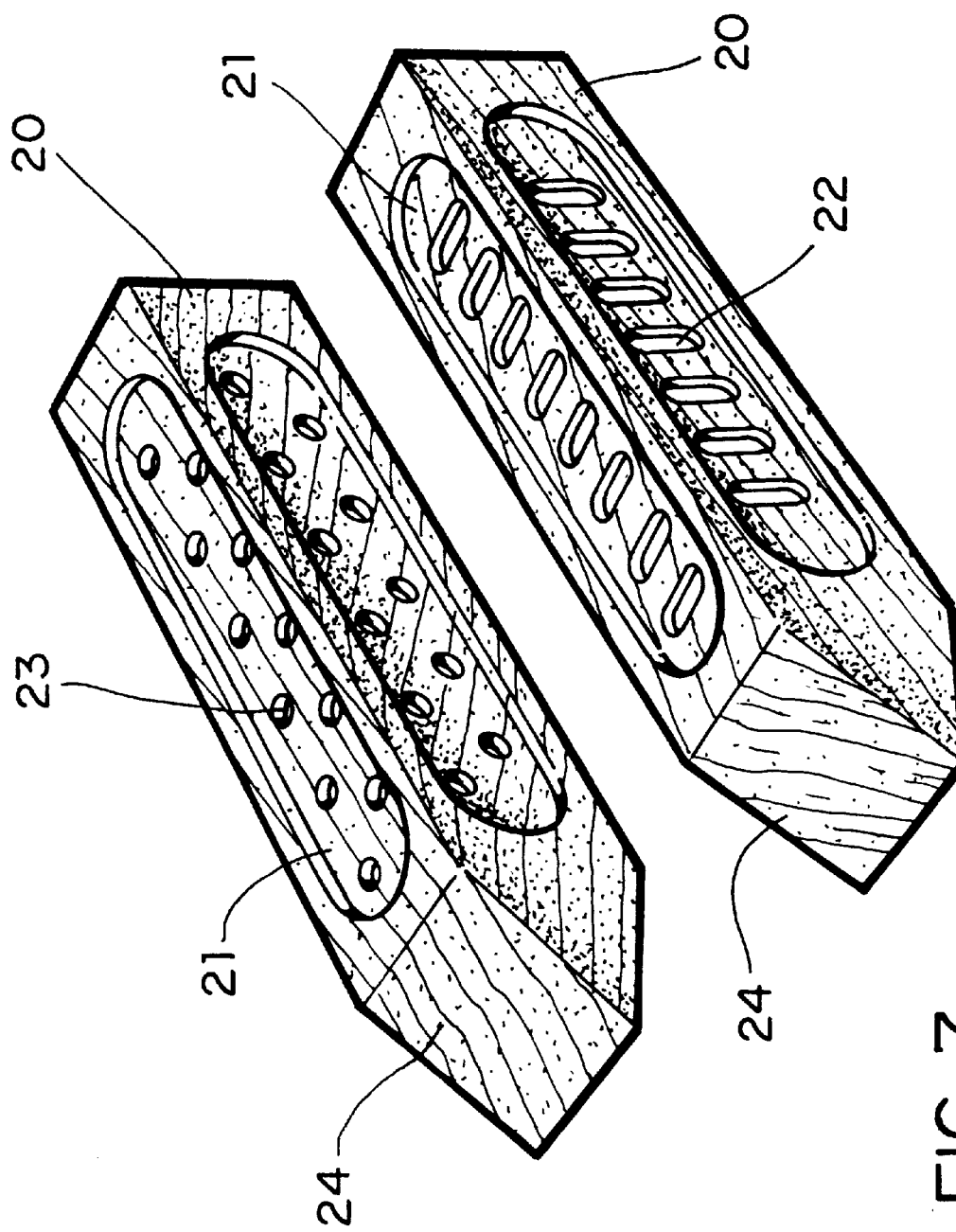
FIG. 7 Illustrates a square casing configuration having an elongated depression forming a membrane.

The unit 1 of FIG. 1 and 20 of FIG. 7 represents a casing or container 1 or 20 as part of the pesticide delivery system. The casings 1 or 20 consist of a soft wood such as pine or similar soft wood specie. Alternatively, a wood derivative material may be substituted for natural wood. The wood is biodegradable and will decompose after some period of time.

The container 1 has a cone shaped bottom or end 2 which is shaped in a cone to aid in driving the same into the ground. The container 1 further has a top closure cap 3 which acts as an anvil when the container 1 is driven into the ground.

Furthermore, the container 1 has lateral holes 4 which may penetrate into the interior of the casing or alternatively they may be blind holes as will be explained later below.

Figure 2:
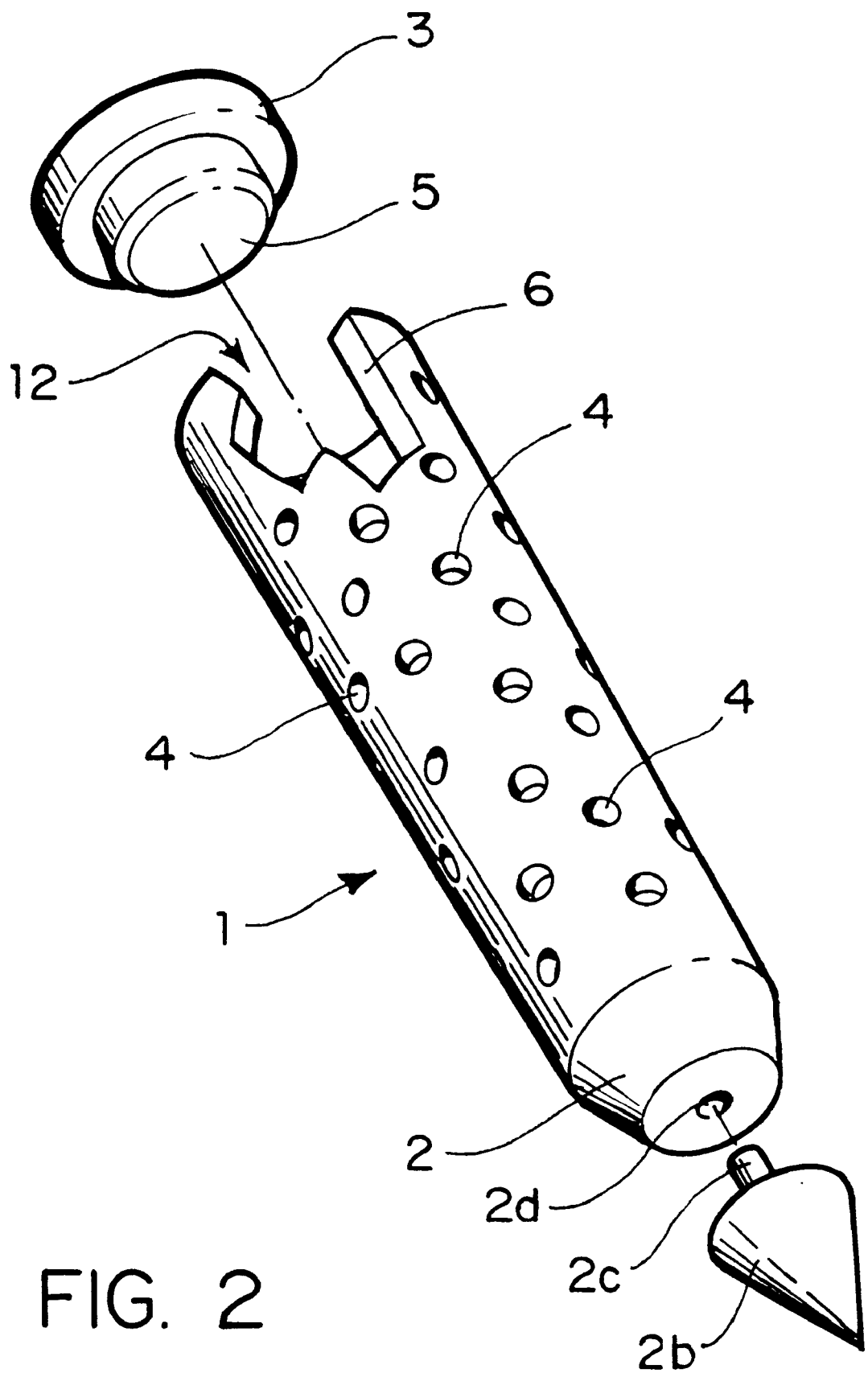
FIG. 2 Shows a unit of the invention in a perspective view.

FIG. 2 is an exploded and perspective view of the casing or container 1. The cone shaped tip 2 has been modified in that the outermost tip has been replaced by a steel or other metal tip 2b which is fastened to the wood tip 2 by means of a pin 2c which is received in a hole 2d. Of course other fastening means may be used. The use of a metal tip aids in driving the casing into the ground to thereby preserve the structural integrity of the casing.

The casing or the container 1 has a parallel sided cylindrical construction as is seen in perspective in FIG. 2. The novel combination anvil and closure member 3 will abut the top 6 of the casing member, and the closure has a reduction 5 of its diameter so that this reduction will snugly fit within the cavity of the casing.

The casing itself has a plurality of holes 4 bored into the same. The bores may be through bores 4 or may be blind bores 7 (FIG. 5) as will be explained later. The internal cavity designated by the numeral 12, terminates as a blind bore in the casing 1.

Turning now to FIG. 3, there is shown a section of the initial stock of the wood prior to being machined into a unit of the pesticide delivery system. The initial stock of the wood is preferred to be cylindrical, but other shapes such as square or rectangular may be used.

Prior to being machined, the stock of wood will be chemically pressure treated by a commercial process such as Wolmanizing, to a depth of about 1 to $2/32$ of an inch.

This is to ensure an initial moisture protection and to deter an immediate attack by insects on the exterior of the casing, and to render the same as a passive surface.

It is understood that in general, after an extended period of time, the chemicals used to pressure treat wood, deteriorate and eventually the pressure treatment is rendered ineffective resulting in the natural biodegradable process of decomposition as the pressure treated wood ages.

As the aging process takes considerably longer than the useful service life of the pesticide delivery system, the integrity of the systems performance will not be compromised, while at the same time, the spent pesticide delivery system's casings will gradually become completely environmentally biodegradable as they decompose.

If the pesticide delivery system casing has not been subjected to the pressure treatment, it will still function effectively and will decompose over a shorter period of time than a pressure treated pesticide delivery system.

It is to be noted that in FIG. 3 and also in other Figs., the depth of penetration of the pressure treating process has been indicated by the shading 1a.

The importance of the controlled depth of penetration of the pressure treatment is obvious as the barrier resulting from the pressure treatment is penetrated by machining operations and untreated wood becomes exposed and vulnerable to attack by the insects.

Turning now to FIG. 4, there is shown a section of casing 1 after a round internal central cavity 12 has been bored into the same to a depth of about $3/4$ of its length and with a diameter of about $1 1/4$ inch, while the outer diameter of the casing is about 2 inches.

These measurements are preferred while obviously other measurements may be used. Thereafter, small diameter holes 4 are laterally bored into the casing penetrating into the interior cavity 12. The holes in the casing side wall are bored in a random fashion and in such a manner that they are not symmetrically aligned.

The reason for this is to prevent further loss of the structural integrity of the casing and to be better able to withstand the impacts when the casing is driven into the ground.

The plurality of holes are located around the entire outer periphery of the casing, the purpose of this pattern is to provide three hundred and sixty degree's of potential entry holes to foraging target insects, once the pesticide delivery system is driven into the ground, so that the insects may have a maximum opportunity to access the pesticide contained inside the interior cavity.

Turning now to FIG. 5, there is shown a section of a somewhat different casing wherein the former through holes 4 have been replaced by lateral blind holes 7. In other words the blind holes 7 do not penetrate into the internal cavity 12 of the casing 1, to thereby leave a thin wood membrane 8, that is, by not penetrating the integrity of the inner surface of the casing 1.

The manner of arranging the holes around the periphery of the casing is the same as it was explained above with reference to FIG. 4.

Figure 6:
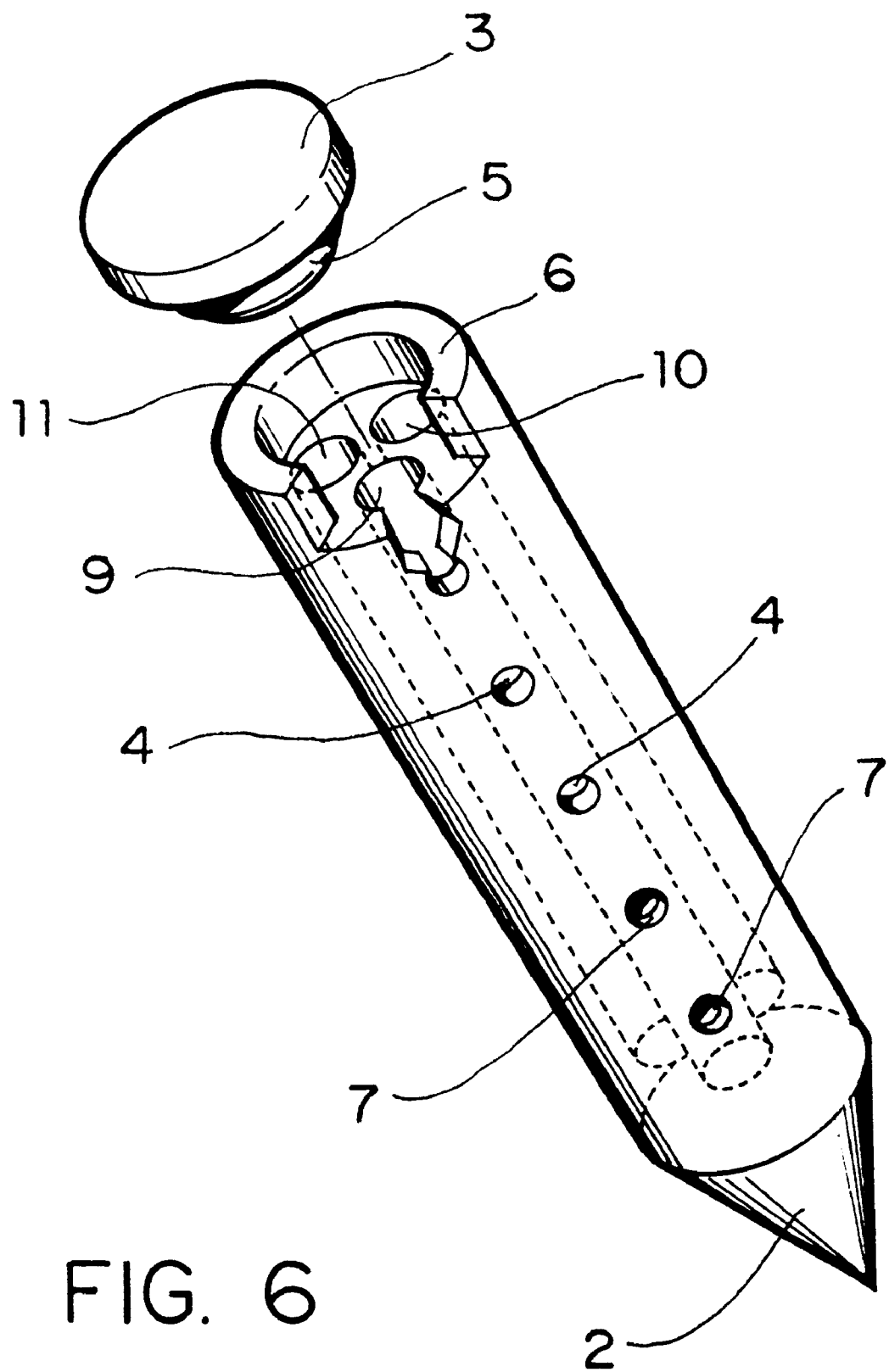
FIG. 6 Is a view of the casing having multiple cavities.

Referring to FIG. 6, there is shown another casing 1 having a plurality of internal bores 9, 10, and 11, instead of having a single bore. These plurality of cavities 9, 10, and 11, could be used for a combination of different pesticides simultaneously for maximum effect. All other aspects of this embodiment remain the same such as the use of through holes 4 or blind holes 7.

Further research has shown that a square shaped casing has the advantage that a large area can be milled out of its four exterior surfaces to form larger membranes into which either slots or holes can be drilled.

The advantages of such an arrangement are a larger membrane surface and a reduction of the total volume of wood available to act as termite forage, the presence of which may slow down the termites transition to the interior cavity of the delivery system.

The termites will subsequently move into the interior cavity faster (where the pesticide is) because there is less foraging available on the exterior surfaces of the delivery system, a secondary benefit of the enlarged membrane.

The large membrane also negates the need for selective pressure treatment of the casing as the termites now have unlimited opportunity to access the interior cavity of the delivery system, therefore pressure treatment of the casing with a wood preservative can be omitted from the process.

Turning now to FIG. 7, showing a squared container 20, having a recess 21, forming a membrane between its top surface and the interior surface of the cavity in the casing 20. Lateral holes 23 or slots 22 can be bored into the casing membrane in a random or staggered manner.

The aforementioned bores are intended to allow faster access of the termites or target insects into the interior cavity of the casing. The numeral 24 represents a chisel point to aid in driving the casing into the ground.

Figure 8:
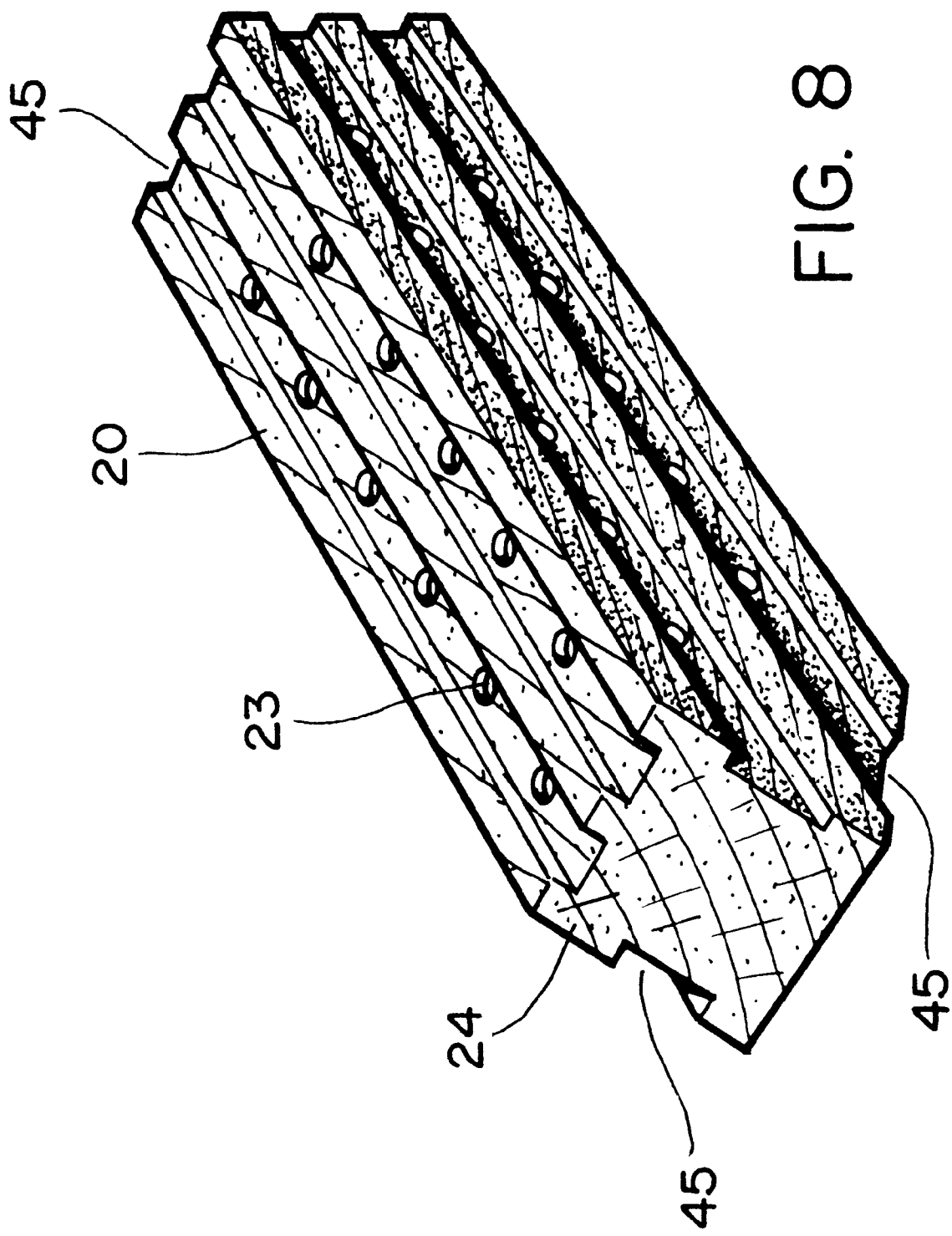
FIG. 8 Shows a square shaped casing having longitudinal grooves thereon.

The structure shown in FIG. 8 provides stimuli to encourage continued termite foraging activity at the site, by providing a unique series of termite oriented grooves which simulate termite mud tubes. The grooves themselves are an integral part of the delivery system which in itself is a total source of food for foraging termites.

Thus the longitudinal grooves 45, cut into the surface of the square casings, provide such simulated termite tubes. Lateral holes 23 may be bored into the bottom of the grooves to enable the termites to gain faster access to the pesticide material contained in the interior cavity of the casing.

Figure 9:
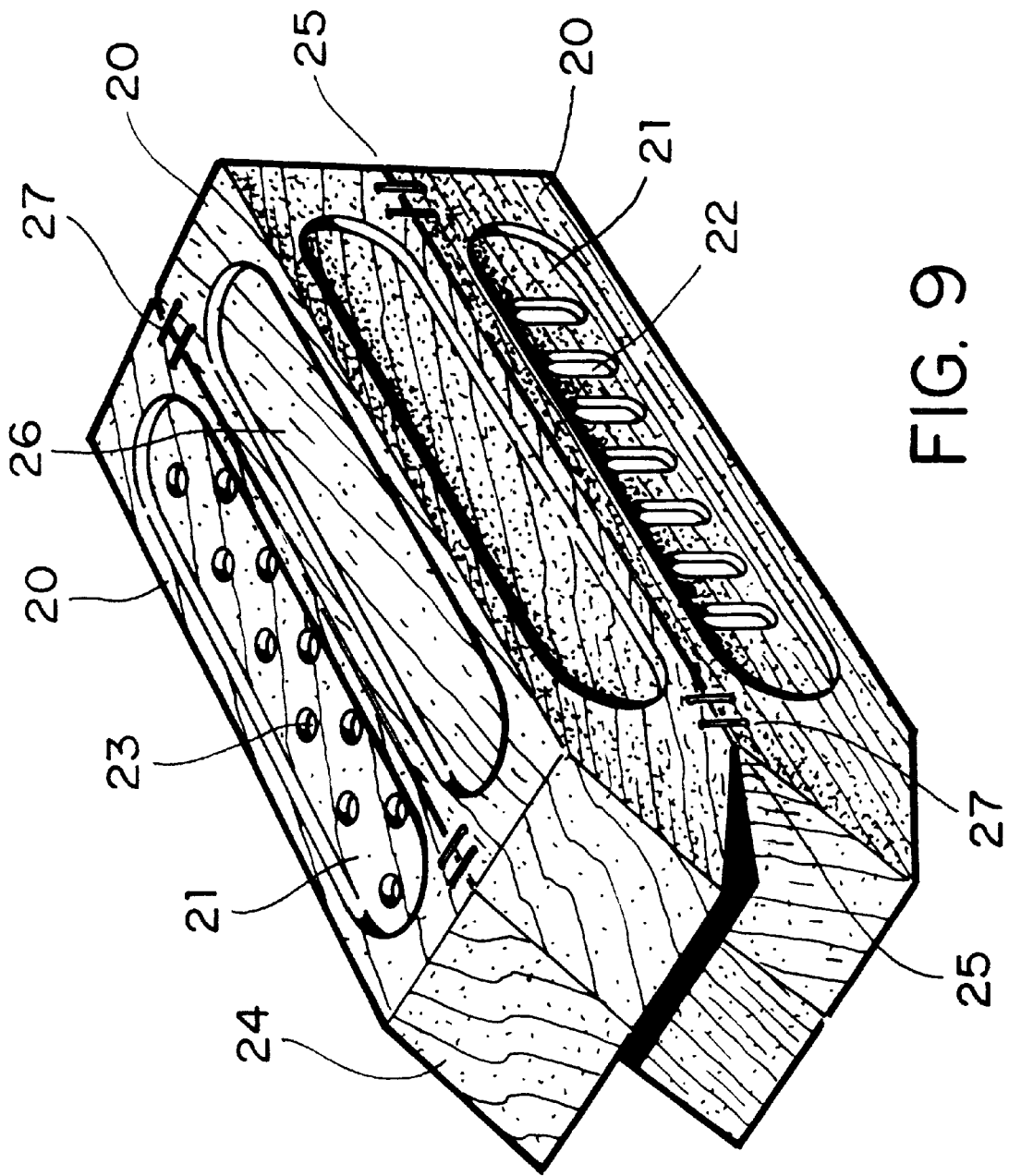
FIG. 9 Shows several casings being clustered together and combined to function as one unit.

FIG. 9 is an illustration of several casings 20 being assembled into a cluster 25. In the depicted assembly there are four casings 20 being clustered or grouped together. Staples 27, or any other fasteners, will secure the assorted casings together. The various sides of the individual casings 20 have a recess 21 milled therein forming the desired membrane mentioned above.

The recessed membranes may have round holes 23 or longitudinal slots 22 bored therein, Alternatively, it is possible to totally omit the boring of holes, or penetrations into the membrane whatsoever, resulting in a longitudinal liquid reservoir 26. This allows the casing 20 to act as a storage reservoir for the use of water, or a liquid pesticide, which will leach through the casing wood membrane 26 resulting in a controlled flow of water or liquid pesticide, as the case may be, through the membrane.

The use of water in a reservoir casing has a practical advantage in dry soil or in drought conditions. Termites require moisture for their survival, therefore they constantly forage for both food, and an accessible source of moisture for the colony.

Accordingly, this fact can be used to induce termite activity by providing a source of moisture in the form of a water filled pesticide delivery system reservoir casing 26 at the location of a pesticide charged delivery system casing.

Figure 10:
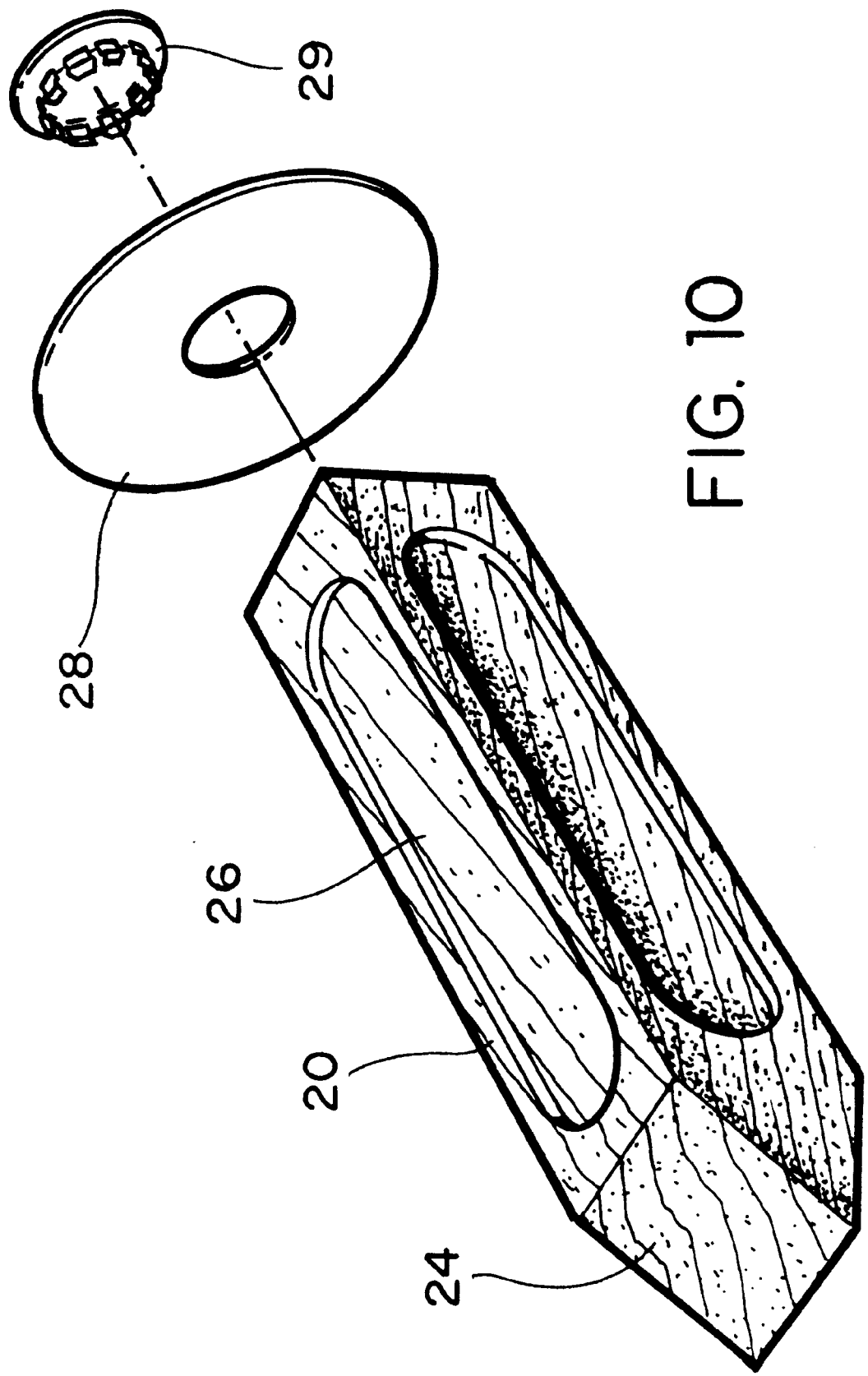
FIG. 10 Illustrates a casing having a detection and location marker thereon.

FIG. 10 Illustrates a detachable location marker so that a pesticide delivery system can be visually or electronically located at a later time once it is installed in the ground. To this end, a round location marker 28 made out of but not restricted to thin gauge metal either in a round or square configuration at approximately two times larger than the top surface area of any one casing to provide easy visual sighting.

The location marker 28 can be secured to the delivery system casing by use of the spring closure cap 29 or any other suitable friction fit fastener which has an extended portion to protrude through the central bore in the location marker.

The spring closure cap and location marker are subsequently mated together and the protruding portion of the spring closure cap is pressed into the opening of the interior cavity of the casing, pressing the location marker firmly to the top of the delivery system casing.

The protruding portion of spring closure 29, has a diameter large enough to aggressively retain the location marker securely in place. Because the location marker 28 is of a larger diameter than the pesticide delivery system, it would remain above ground.

In addition, if the location marker is fabricated out of metal, the large surface area would provide a significant target for electronic detection and location utilizing a metal detector such as made by Tandy Corp. Cat: #63-3005. The location marker would also serve to deflect rain and water from the top of the casing.

The location marker can be painted with a bright fluorescent color to facilitate a visual sighting. The location marker can also be made out of other brightly colored material, but preferably a biodegradable, environmentally friendly material.

Figure 11:
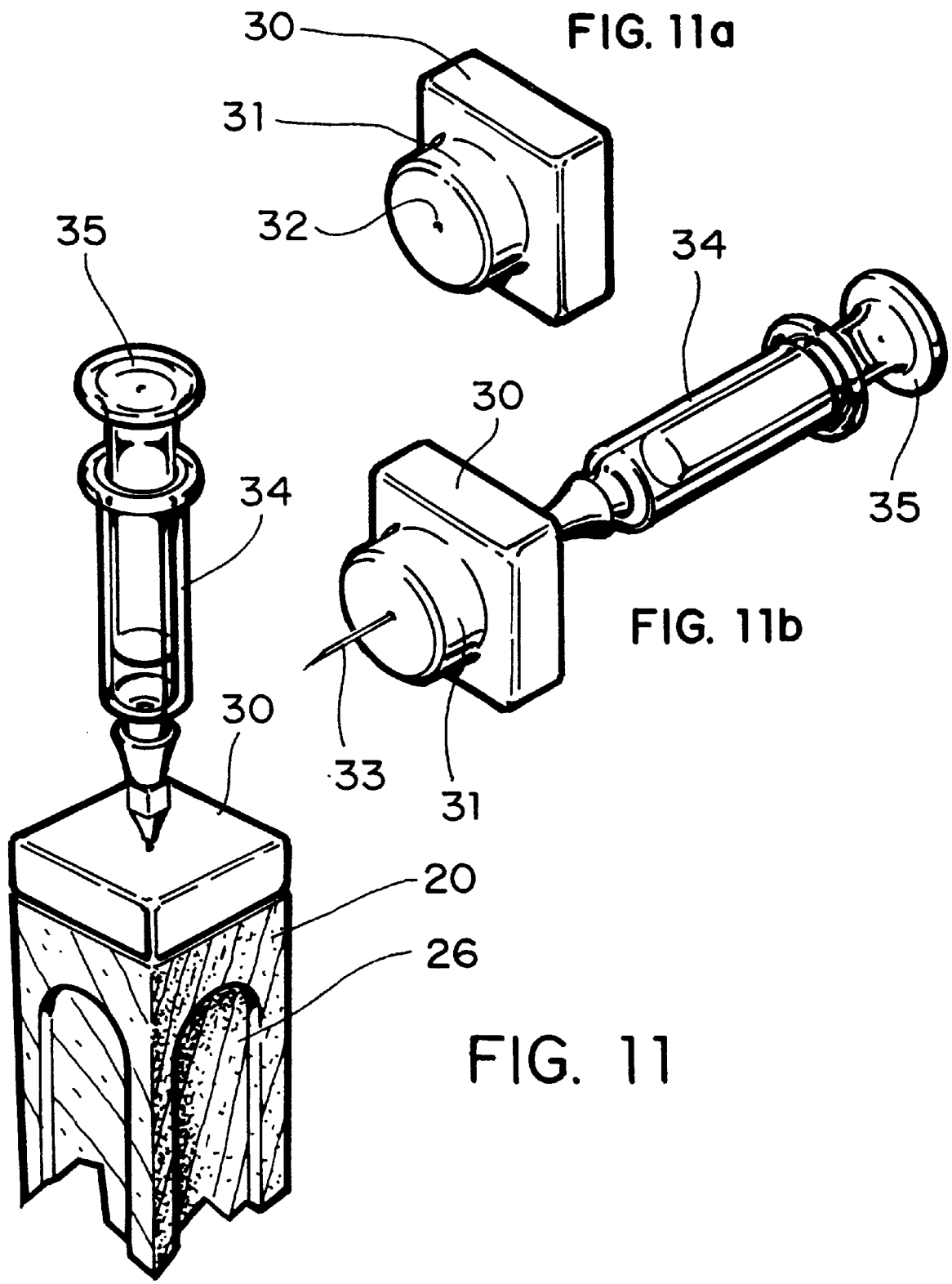
FIG. 11 Shows a pesticide injection system for filling material into the casing.

FIG. 11 Illustrates a novel method of filling or replenishing liquid pesticides or other materials into a Biodegradable Pesticide Delivery System after it is installed into the ground. In that the casing 20 is configured with the membrane as a reservoir 26 with no bored perforations in said membrane.

The casing has a rubber closure FIG. 11*a*, 30 with a cylindrical extension 31 which fits snugly within the opening of the interior cavity, to seal it off from the outside. Alternatively, other flexible closure materials such as cork or neoprene may also be used.

The closure has a self sealing hole FIG. 11*a*, 32, through which a hypodermic needle FIG. 11*b*, 33, or another filling apparatus can be inserted to inject additional liquid as required to compensate for expended fluid. The hypodermic body 34, has a plunger 35.

Once the additional liquid has been injected into the interior cavity of the casing, and the needle 33, is withdrawn from the hole 32, in the rubber closure, the hole 32, in the rubber closure 30, will contract internally and seal itself due to the elastic nature of the rubber or other flexible material, to thereby perform a self sealing function.

Figure 12:
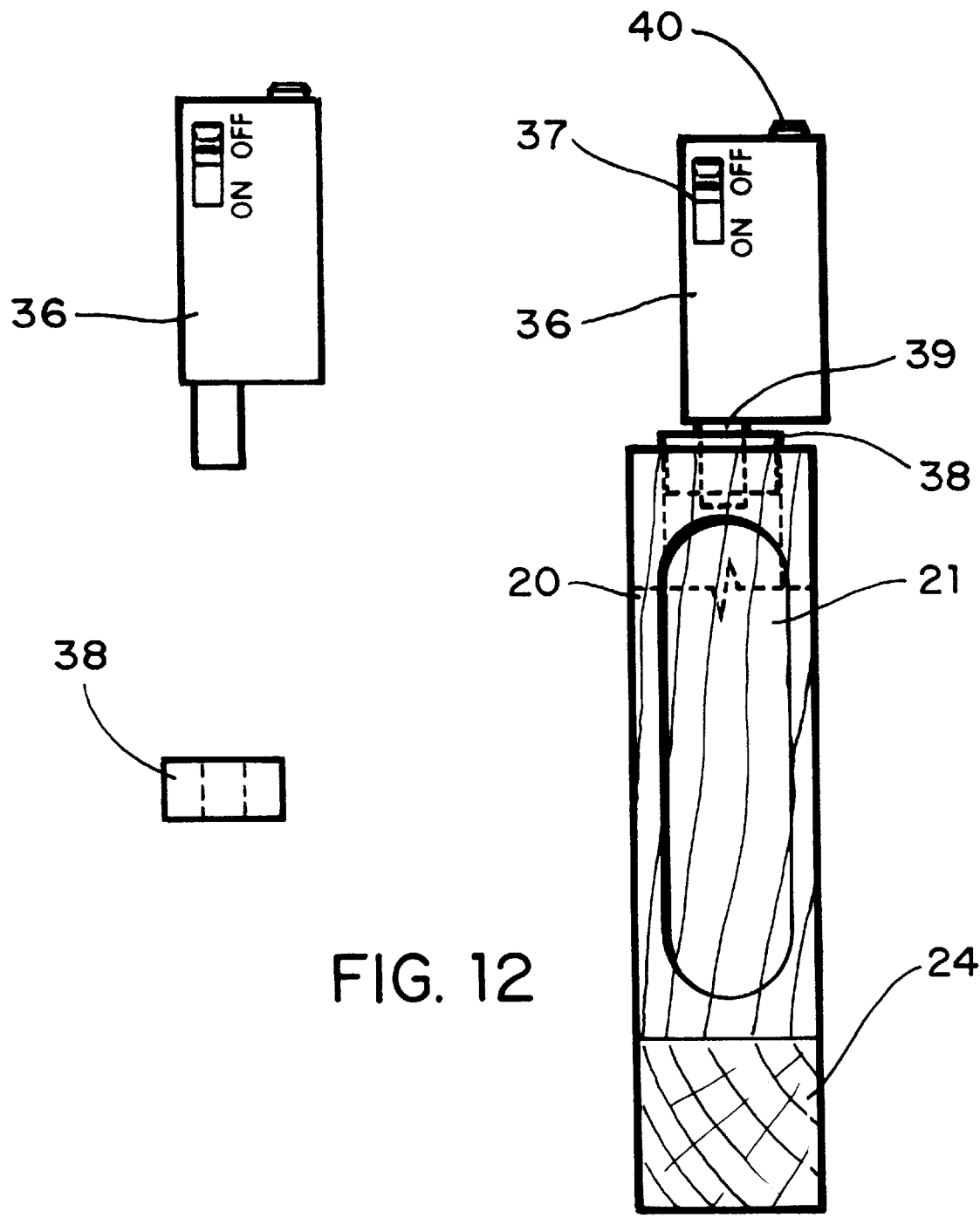
FIG. 12 Illustrates an acoustical monitoring system.

Turning now to FIG. 12, there is revealed yet another unique and novel feature of this invention, and that is, the capability to use a highly sensitive microphone inserted into the entrance of the interior cavity of an installed Biodegradable Pesticide Delivery System.

The purpose of which is to detect electronically the presence of attacking insects, who have penetrated into the interior cavity of the pesticide delivery system.

If advanced monitoring, or control procedures are being used, the ability to determine if termites have attacked a pesticide delivery system is a critical factor. Known termite biology at this time, suggests that there is presently no reliable method to attract termites.

Therefore, termites establishing a foraging site at a location, where there is a pesticide delivery system present, literally depends on the interception of the pesticide delivery system site, by termites foraging randomly through the ground.

For that reason, confirmation that there has been a termite interception, and that termites are active at the site, is extremely valuable information for more advanced procedures. Such information can be used as the basis for planning an aggressive termite control program in the identified location with a minimum of delay.

The invention at hand has solved the problem of detecting termite activity in the following manner.

Due to the large size of the integral wood membranes of which there are four (see FIG. 7), one on each side, they have the ability to act as an acoustical membrane and result in the interior cavity of the pesticide delivery system performing as a resonating auditory effect chamber which is capable of sound amplification.

It is therefore possible to detect the presence and movement of termites or other insects inside the interior cavity of the pesticide delivery system. This is achieved by amplifying the sound waves generated inside the interior cavity, utilizing an electronic acoustical audio detection system. This will convert the detected sound frequency to a level which is audible to the human ear.

The wood membranes, of which there are a total of four (see FIG. 7), one on each side, due to their size and thin cross section, will resonate when subjected to the movement of termites or other insects within the interior cavity.

This resonance has the ability to amplify the sound of termites as they forage inside the interior cavity of the pesticide delivery system. However, the sound waves thus generated, are inaudible because they fall beyond the frequency response of the human ear.

A highly sensitive microphone, as for example the TECT super Cardoid condenser microphone model UEM-88, manufactured by Teisco Sound Research, is capable of further amplifying the resonant sound waves generated by the membranes, to an audible signal which can be heard by the human ear. The signals thus produced are indicative of the presence of termites or other insects. In order to utilize a detecting device as described above one would proceed as follows:

After the pesticide delivery system has been installed in the ground for a period of time, the activity of termites within the pesticide deliver system can be monitored if so desired in the following manner:

The model UEM-88 microphone 36, in FIG. 12, has an extended round probe measuring approximately half inch long, with a diameter of three eighths of one inch. A rubber or other suitable flexible material spacer 38 would be placed around the extended probe 39 of the model UEM-88 microphone and the extended probe 39, complete with the spacer 38, would be pressed into the interior cavity opening.

The diameter of the spacer 38 would be large enough to effect a friction fit between the microphone probe and the inside diameter of the pesticide deliver system interior cavity opening.

After the insertion has taken place, there would be minimum movement of the microphone probe when it is in situ, as the probe is retained securely in place by the friction fit as was explained above. In addition, the friction fit would ensure a minimum of extraneous external sound waves degrading the quality of the amplification.

After following the probe insertion procedure the model UEM-88 microphone probe 36, would be switched on by switch 37 and calibrated following the manufacturers instructions. The highly sensitive microphone would be used preferably with an appropriate ear phone head set plugged into the ear phone jack 40.

By using this method of acoustical detection termite or other insect activity can be monitored inside individual pesticide delivery systems without following intrusive procedures or disrupting the termites foraging patterns by performing a physical inspection.

Alternatively, it would be possible to create the same membrane acoustical effect by not milling a recess 21 in the outside surfaces of the pesticide delivery system. and boring the largest bore possible for the interior cavity.

This should be done without compromising the structural integrity of the casing walls or capability to bore holes 23 or slots 23 in said walls. Said wall members of the pesticide delivery system casing would now constitute the active membranes.

Further testing and research has revealed a significant and ubiquitous problem encountered when a pesticide delivery system is installed in the ground because sand or small particles of material have the tendency of filtering through the laterally drilled holes or slots which lead into the casing interior cavity that is used as a pesticide depository.

This is so because the laterally bored holes are at a 90 degree angle relative to the vertical axis of the pesticide delivery system which is inserted into the ground in a vertical angular orientation. Therefore, the laterally bored holes in the casing, are on a horizontal plane, and parallel with the surface of the ground.

The result of such an arrangement, as previously described, culminates in the deposit of soil particles in the laterally bored holes from where it ultimately filters into the interior cavity of the pesticide delivery system. The filtering action is the combined result of earth movement dynamics, and the forces of gravity.

The accumulative effect, of the above noted action, is to result in an increasing quantity of foreign material either being forced, or filtered through the lateral holes or slots and subsequently deposited into the interior pesticide cavity resulting in a degrading of the effectiveness of the incumbent pesticide due to moisture and contaminants.

A secondary concern is that the buildup of filtrate inside the lateral bored holes, and subsequently the interior cavity, presents an additional physical barrier for foraging termites to overcome before reaching the pesticide.

Figure 13:
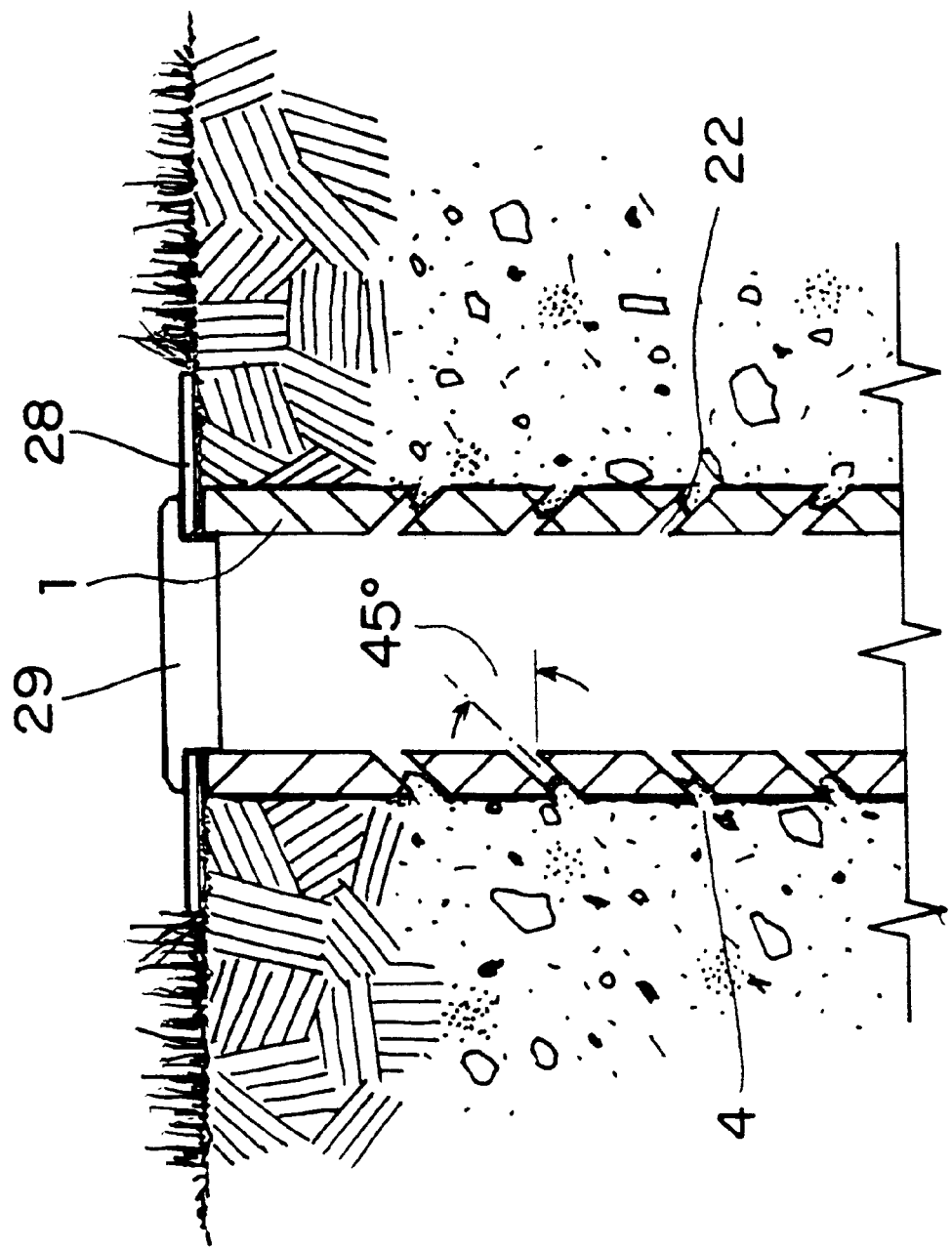
FIG. 13 Illustrates an invention installed in the ground with lateral holes bored at a 45 degree angle upwardly from horizontal.

FIG. 13 Illustrates a method that will overcome the above noted problems. The casing 1, (round) or 20 (squared) seen as it is installed in the ground. Holes 4 or slots 22 are bored at an angle of approximately 45 degrees from the horizontal and sloping upwardly. The numeral 29 represents a top closure for the interior cavity and numeral 28, indicates a location marker.

If the aforementioned holes were sloping downwardly, they would defeat the purpose of angulation because the gravity of the earth and earth dynamics would result in earth particles filtering through the holes and into the interior of the cavity.

It is essential that any randomly foraging termites which by chance, intercept a pesticide delivery system, be motivated to establish a foraging site at the location of the intercepted delivery system. Subsequently, the termites will then recruit other colony members to forage at that site.

This, however, will only take place if the termites are induced to remain, and investigate the site further. This can be done by providing what is perceived by the termites, as a termite friendly environment. Which is the objective of this invention.

Figure 14:
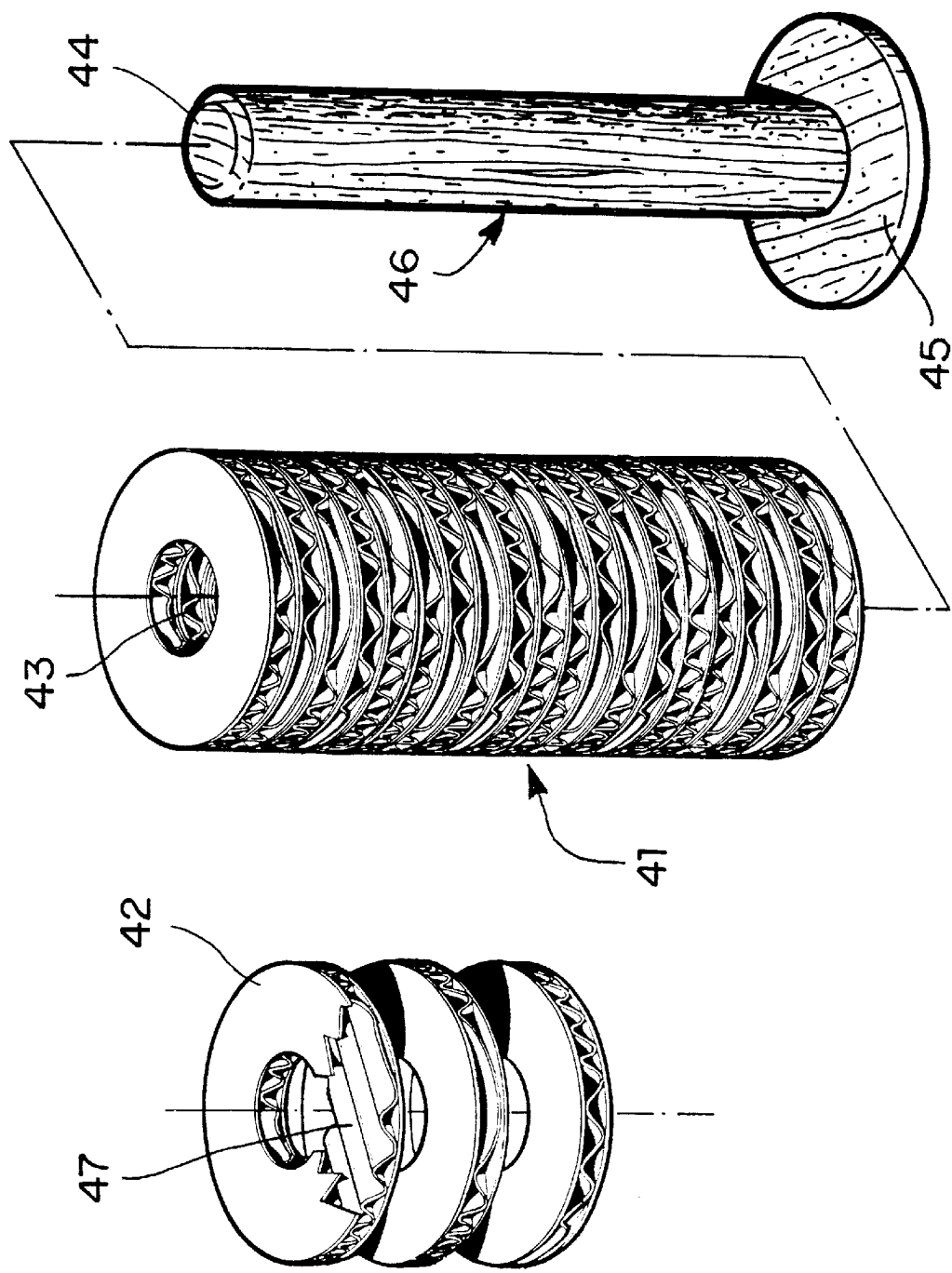
FIG. 14 Shows a corrugated paper interior cavity matrix, and matrix holder.

FIG. 14 Illustrates a corrugated paper cavity matrix 41 which can be installed into the interior cavity of the pesticide delivery system casing. The cavity matrix is constructed of round disks of corrugated paper 42 which are die cut from corrugated paper sheet stock which is approximately three sixteenths of one inch thick.

The disks 42 are subsequently secured together with a suitable adhesive or other means and stacked one on top of another, to form a typical column cylindrical shape. The approximate height which would be equal to three quarters of the total length of the casing interior cavity.

It should be noted that the disks 42 are stacked and oriented in such a manner that the corrugations in the disks 42, as viewed from the periphery, are asymmetrically aligned. This protocol is necessary because the said corrugations on each individual disk 42 are manufactured in parallel alignment to each other which is a standard configuration for corrugated paper.

It can be readily understood from the above description that if the disks 42, were all in symmetrical alignment relative to the corrugation openings after being secured together, that there would be two quadrants of the corrugated paper cavity matrix 41, circumference, located 180 degrees apart and representing fifty percent of the total surface area which would be devoid of any corrugation openings.

This is because the parallel sides of the corrugations would all be in parallel alignment at the same quadrant of the periphery.

The result of such an arrangement would be to circumvent the access of insects who enter the pesticide delivery system laterally bored holes, at the location that is aligned with the non corrugated opening quadrant of the corrugated paper cavity matrix periphery. This is because there would be no corrugated openings at that venue to entice them further into the interior cavity.

This problem has been solved by the invention at hand as follows.

In order for the opening of the corrugations to be in alignment with the maximum number of laterally bored holes in the pesticide delivery system casing, when the corrugated paper cavity matrix is placed into the interior cavity of the casing. The procedure is as follows.

The lineal corrugation openings of each successive disk must be offset approximately ten degrees relative to the lineal corrugation openings of the preceding disk. To provide symmetry to this nominal alignment, the offset adjustment should be made in a consistent direction of rotation, recommended to be clockwise.

The above procedure will ensure a graduated orientation of the disks 42 providing the best compromise alignment of the corrugated paper openings, and the laterally bored holes of the pesticide delivery casing.

In this manner, the area of the circumference of the corrugated paper cavity matrix 41, which is devoid of any corrugated openings, is dispersed uniformly over the total surface area of the corrugated paper cavity matrix periphery.

There is a small diameter hole 43 die cut through the center portion of each round corrugated paper disk which is intended to allow the assembled cavity matrix cylinder 41 to be placed on to the shaft 44 which is an integral part of the cavity matrix holder 46, The diameter of the completed cylindrical corrugated paper cavity matrix 41, would be such that it can be inserted into the interior cavity, or withdrawn from the interior cavity of the delivery system casing, requiring little or no torque. Conversely, there should also be a minimum of side play between the inside wall of the casing interior cavity and the outside surface of the corrugated paper cavity matrix.

The optional cavity matrix holder 46, which is fabricated out of wood, consists of a shaft 44 and a plinth 45 which is secured to the shaft 44 by means of a screw. The complete assembly can be used to hold, insert, and withdraw the corrugated paper cavity matrix from the casing interior cavity.

This is so, because the plinth 45 has a larger diameter than both the cavity matrix holder shaft 44 and the centrally bored hole 43, of the corrugated paper cavity matrix 41. The larger diameter of the plinth 45, therefore provides a shoulder on which the corrugated paper cavity matrix sits.

As the cavity matrix is loaded on to the shaft 44 of the cavity matrix holder 46, the cavity matrix 41, will sit on the plinth 45 of the cavity matrix holder. The combined assembly of both the corrugated paper cavity matrix 41 and the cavity matrix holder 46 is placed into the interior cavity of the casing as a single unit.

The entire assembly can be withdrawn from the casing interior cavity by grasping the top of the cavity matrix holder shaft 44, which protrudes through the centrally bored hole in the center of the corrugated paper cavity matrix, and withdraw the complete assembly up and out of the interior cavity. The plinth 45 attached to the bottom surface of the cavity matrix holder shaft 44, will support and lift the corrugated paper matrix out.

It can be readily seen that the corrugated paper disks 42 are oriented with the corrugations 47 on a horizontal plane. This is so, because when the corrugated paper cavity matrix 41 is installed inside the interior cavity of the pesticide delivery casing, the corrugations 47 will be randomly but horizontally aligned with the maximum number of laterally bored hole locations in the said casings.

This is necessary, as it is important to induce the insects further into the interior of the pesticide delivery system. In this manner, the insects exposure to the pesticides contained therein, is greatly enhanced.

This is true, because of the numerous types of pesticide material formulations available, which vary greatly from one manufacturer to another. There are pesticide materials which are to be ingested, while other types are effective upon contact. Also there are biological agents with a limited life span.

So therefore, it is imperative to induce the insects into the interior of the pesticide delivery system in the shortest possible time and provide them with an ample supply of forage to increase the time span of their exposure to the pesticide material. In addition, there must be an incentive for the foraging insects to recruit additional colony members to the site of the pesticide delivery system.

Insects prefer confined spaces and also have a preference for loose cellulose fibers. Therefore it is readily apparent, that when wood destroying insects make the transition through the lateral bored holes of the pesticide delivery casing, they will be intercepted by the horizontal corrugations 47 of the corrugated paper cavity matrix 41.

The foraging insects will be further attracted not only to the tubular like shape of the corrugations 47, which resemble termite tubes, but the abundance of soft cellulose fibers which make up the construction of corrugated paper. This fact will result in continued foraging activity by the target insects who will consequently enlist other colony members to the foraging site.

With this in mind, the corrugated paper cavity matrix may either be used as a passive, non active, but powerful additional incentive to enlist foraging insects to the site, after which time the corrugated paper cavity matrix can be removed from the interior cavity of the casing and substituted by an active pesticide material.

Alternatively, the corrugated paper cavity matrix 41 can be impregnated, or dusted by a manufacturer, with an active pesticide prior to its installation into the interior cavity of the casing. By this means, the optimum tactical advantage is realized from such an arrangement.

That is to say, a corrugated paper cavity matrix 41, constructed of a highly termite attractive source of forage, namely corrugated paper, which is also in a physical configuration that is representative of termite mud tubes, thereby inducing them to enter the corrugations.

At such time that termites enter the corrugations 47, the insects will be exposed and vulnerable to the pesticide material that has been impregnated, or dusted on, or into, the corrugated paper cavity matrix 41.

Such a corrugated paper matrix arrangement placed inside the interior cavity of the pesticide delivery system with the added feature of having the corrugations in a horizontal alignment with the laterally bored holes in the casing membranes, even if the bored holes are at a angle of 45 degrees, will ensure that insects entering the pesticide delivery system casing are exposed to the pesticide material at the onset of their intrusion and to the maximum degree.

It is also possible to impregnate, or dust, the corrugated paper cavity matrix with a pesticide material and then install it into the interior cavity without the cavity matrix holder. By following this procedure, the unoccupied central bore 43 of the corrugated cavity matrix 41 can also be charged with additional pesticide material.

This protocol offers the opportunity for a secondary pesticide material exposure to the termites. Particularly if one source of pesticide exposure is the result of the pesticide impregnated cellulose fibers of the corrugated paper cavity matrix, and the additional source of exposure being direct contact with a pesticide.

The secondary pesticide can be either in solid or granular form, deposited into the central bore 43 of the corrugated paper cavity matrix. Said pesticide which may be of an alternative pesticide formulation to that of the impregnation, for optimal effect.

If the corrugated paper cavity matrix is either impregnated or dusted with a pesticide, then the need to replace the corrugated paper cavity matrix with a substitute pesticide insert once termite activity is known, becomes redundant.

Alternatively the corrugated paper cavity matrix can be fabricated without a central bore to optimize its effectiveness when used as a primary insert for storing the pesticide material.

There is only a brief window of opportunity to induce and hold the attention of randomly foraging termites, or other wood destroying insects before they abandon a newly discovered foraging site. By following the teachings of this invention, the probability of a successful termite or other wood destroying insect interception and resultant colony elimination, is greatly enhanced.

SUMMARY OF THE INVENTION

The long-standing but heretofore unfulfilled need for a biodegradable pesticide delivery system for administering pesticides, in such a manner as to be easily utilized by those unskilled in the art and available at a reasonable cost, is now fulfilled by the invention disclosed hereinafter and summarized as follows.

The pesticide delivery system consists of a perforated wooden casing that is fabricated out of a soft wood, such as pine or other soft wood specie, or alternatively a wood derivative cellulosic material, which may or may not be pressure treated as the case may be.

The present invention selects wood as a primary manufacturing material, as this represents the most desirable form of cellulosic food or a material for the target insects, and is without question a termite attractive, edible bait material.

While natural wood is the material of choice, it can be seen that a cellulosic composite wood by-product material may be substituted for natural wood without substantially degrading the performance of the pesticide delivery system.

However, it can be readily seen that there can be no faster way to attract wood destroying insects than by using sacrificial wood. The presence of wood lures the target insects into a false sense of security, and establishes, and consolidates a desirable site for their attention.

By using this inventive concept, during the course of their activities, the noxious insects will be introduced to the pesticide material gradually as they become increasingly aggressive at the site of the pesticide delivery system.

When foraging insects have discovered the pesticide delivery system, there should be no disruption whatsoever, so as not to disturb the foraging galleries which are formed as a part of the foraging target insects natural activity.

Any disturbance will inevitably delay the insects acceptance of the site or may even result in the target insects abandoning the location all together to thereby forage somewhere else.

An inherent problem with systems of the present art is that many of them require a periodic physical inspection of the monitor or pesticide stations to verify the presence of target insects, thereby disturbing the insects and disrupting their foraging continuity.

The casings of the invention are placed around the perimeter of a structure to be protected, at certain intervals driven into the ground, or alternatively laid upon the surface.

It is obvious that foraging insects will enter the pesticide delivery system units as they are lured into the plurality of bored holes in the casing side wall to access the exposed untreated wood, which is only about one thirty second of an inch inside the bored holes, beyond the outer exterior pressure treated surfaces of the casing.

Once the attacking insects are inside the bored holes, the exposed and untreated wood surfaces will encourage their continued presence. Also there is no impediment to their forward travel towards the casing's internal cavity which contains the pesticide material.

Without any outside disruption of the attacking insect's feeding frenzy, they will progress unhindered to the pesticide material contained in the central cavity.

Thus, the exterior pressure treated surfaces of the wood casing will essentially be protected against attacking insects for an extended period of time.

As a result of this exterior pressure treatment of the wood casing, attacking insects are lured quickly into the interior cavity of the casing as they pursue their search for edible material, since they are not motivated to waste time on the remaining pressure treated exterior areas of the pesticide delivery system.

In the pesticide delivery system of FIG. 4, wherein the casing 1 has the numerous through bores 4, it may be necessary to prepackage granular or liquid pesticides inside a thin walled biodegradable termite edible cellulosic material cartridge, such as for example waxed paper.

This would allow safe handling of the pesticide charged casings of the pesticide delivery system and avoid any loss of pesticide material through the casing side wall holes prior to installation in the ground. The pesticide cartridge, if one is required, would be of sufficient size as to fit snugly inside the internal cavity of the casing.

As to the casing, as explained with reference to FIG. 5, wherein blind holes have been bored in the casing wall, the pesticide material can be handled in quite a different manner.

The membrane 8 left in the interior wall of the cavity has numerous important functions, primarily it serves as a barrier between the end of the blind holes and the interior cavity 12 of the casing.

The wood membrane will permit the use of pesticide materials inside the interior cavity of the casing without the use of a auxiliary container for the pesticide material.

The wood membrane will also prevent the escape of pesticide material from the interior cavity of the casing prior to installation.

The barrier which is formed as a result of the wood membrane also isolates the pesticide material from the user of the pesticide delivery system resulting in safe handling.

Furthermore, the wood membrane also minimizes the overall structural weakening of the casing which is caused as a result of the numerous bored lateral holes and the central cavity.

Further research has shown the use of a squared casing has the advantage of creating a large area which is milled out from any of the surfaces to form a membrane into which either holes or slots are bored.

The advantage is that there is a reduction of the total volume of wood available to act as termite food which would otherwise slow down the termites transition to the interior cavity of the pesticide delivery system.

It also negates the need for a selective pressure treatment of the casing as the termites now have an unlimited opportunity to access the interior cavity of the pesticide delivery system.

Therefore, selective pressure treatment of the casing with a wood preservative can be omitted from the process resulting in quite a saving of costs.

Having a squared casing gives the opportunity of ganging multiple casings together into a one unit cluster or group. A grouping of units facilitates the combining of assorted casings to optimize the degree of effectiveness by presenting a larger total surface area to intercept termites.

In addition, it is also possible to use several different pesticides in the same cluster by charging individual pesticide delivery system casings with different pesticides.

Therefore, it would be possible to have for example, a group of four pesticide delivery systems clustered together, with each of the individual pesticide delivery system units containing a different pesticide.

A squared casing also offers the opportunity to provide longitudinal grooves in each of the surfaces of the squared casings. Such grooves simulate mud tubes that the termites build for themselves to traverse through the ground.

Thus, the simulated termite tubes provide an irresistible enhancement for the insects to be induced into them and be directed to where the pesticide material is located.

The squared casing can be produced either out of solid stock material or alternatively, construction of the squared casing could be achieved using multiple panels having a planar surface, and secured together to thereby form a square casing.

As it is very difficult to attract termites, additional stimulus to induce them into the central cavity of the pesticide delivery system where the pesticide is located is called for. when foraging termites intercept the pesticide delivery system, they will traverse through the lateral bored holes, and enter the corrugated tubes of the corrugated paper cavity matrix.

Once inside the corrugated tubes, the termites will be subliminally induced to stay and forage, by the abundance of loose cellulose fibers from the corrugated paper. Accordingly, they will recruit other colony members to the site, and eventually gravitate to the interior cavity where they will make the transition to forage on the pesticide material.

The volume of cellulose fibers available inside the corrugated tubes will continue to induce fresh termites to the site ensuring continued termite activity.

It should also be noted that the location marker 28 of FIG. 10, the hypodermic injection arrangement of FIG. 11, the acoustic monitoring system of FIG. 12, and the holes bored at 45 degrees from the horizontal of FIG. 13, and the corrugated paper cavity matrix 41 of FIG. 14, are all equally applicable, and interchangeable to round casings, as well as to squared casings, all as has been explained above.

It will thus be seen that the objects set forth above, and those made apparent from the foregoing description are effectively attained and since certain changes may be made in the above described construction without departing from the scope of the invention.

It is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A pesticide delivery system consisting of multiple stations, each station consisting of a wooden, or wood derivative, biodegradable casing having a longitudinal central bore therein forming a casing wall and further having a multiple of lateral holes penetrating through said wall, said holes are placed at an angle of forty five degrees from the horizontal and sloping upwardly, and a pesticide material contained in said casing.

2. A pesticide delivery system consisting of multiple stations, each station consisting of a wood, or wood derivative biodegradable casing having a longitudinal central bore therein forming an interior cavity and an outer casing wall, said casing having at least four outside planar surfaces, at least one said stations on its planar surfaces is provided with longitudinal depressions extending substantially into the thickness of said casing and thereby forming a membrane between the outer casing wall and the inner wall of said central bore, while at least one of the other stations includes holes penetrating through said membranes.

3. The biodegradable system of claim 2 wherein said interior cavity contains a corrugated paper matrix consisting of a plurality of corrugated disks secured together to thereby form a multiple layer column, and having openings of said peripheral corrugations of said corrugated disks aligned in a horizontal orientation relative to the laterally bored holes of the pesticide delivery casing.

4. A biodegradable pesticide delivery system of claim 2, wherein said holes are lateral slots penetrating through said membranes.

5. The biodegradable pesticide deliver system of claim 2 including lateral slots penetrating through said membrane.

6. The biodegradable pesticide delivery system of claim 2 including a chisel point at one end thereof to aid in driving said casing into the ground.

7. The biodegradable delivery system of claim 2 including a detachable location marker placed over the open end of said casing and means for fastening said marker at said open end.

8. The biodegradable pesticide delivery system of claim 2 having a flexible material closure sealing the top of said casing with a cylindrical extension penetrating into the interior of said casing and means for injecting pesticides through said flexible closure.

9. The biodegradable pesticide delivery system of claim 2 including means for acoustically monitoring the presence of insects within said casing.

10. The biodegradable pesticide delivery system of claim 2, wherein at least one of said other stations does not have any lateral penetrations of said outside planar surfaces penetrating through said membrane between the outer casing wall and the inner wall of the central bore thereby providing a complete separation of the central bore from the outside surfaces of said casing, therefore allowing said central bore to be used as a sealed liquid reservoir after a closure is installed.

11. The biodegradable pesticide delivery system of claim 2 wherein the longitudinal exterior planar depressions do not have any lateral perforation of the membrane between the outer casing wall and the inner wall of the central bore thereby providing a complete separation of the central bore from the outside surface of the casing therefor allowing the central bore to be used as a sealed liquid reservoir after a closure is installed.

12. A biodegradable pesticide delivery system consisting of multiple stations, each station consisting of a wood or wood derivative biodegradable casing having a longitudinal central bore therein forming a casing wall, said casing having at least four outside planar surfaces, each of said surfaces having longitudinal grooves provided therein extending in the direction of said casing, and a multiple of holes provided in the bottom of each groove.

* * * * *